United States Patent
Axmon et al.

(10) Patent No.: US 10,194,434 B2
(45) Date of Patent: Jan. 29, 2019

(54) METHOD AND APPARATUS FOR SCHEDULING OF A WIRELESS DEVICE

(71) Applicant: Telefonaktiebolaget L M Ericsson (publ), Stockholm (SE)

(72) Inventors: Joakim Axmon, Kävlinge (SE); Muhammad Kazmi, Bromma (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 546 days.

(21) Appl. No.: 14/673,013

(22) Filed: Mar. 30, 2015

(65) Prior Publication Data
US 2015/0289267 A1 Oct. 8, 2015

Related U.S. Application Data

(60) Provisional application No. 61/974,837, filed on Apr. 3, 2014.

(51) Int. Cl.
 *H04W 24/10* (2009.01)
 *H04W 72/04* (2009.01)
 *H04W 72/12* (2009.01)

(52) U.S. Cl.
 CPC ....... *H04W 72/0446* (2013.01); *H04W 24/10* (2013.01); *H04W 72/0413* (2013.01); *H04W 72/12* (2013.01); *H04W 72/1268* (2013.01)

(58) Field of Classification Search
 CPC ............. H04W 72/0446; H04W 24/10; H04W 72/0413; H04W 72/12; H04W 72/1268
 (Continued)

(56) References Cited

U.S. PATENT DOCUMENTS

2010/0034126 A1 2/2010 Kitazoe et al.
2010/0290420 A1* 11/2010 Dalsgaard ............. H04L 5/0044
 370/329
(Continued)

FOREIGN PATENT DOCUMENTS

WO 2013153513 A2 10/2013

OTHER PUBLICATIONS

3GPP, "3rd Generation Partnership Project; Technical Specification Group Radio Access Network; Evolved Universal Terrestrial Radio Access (E-UTRA); Physical Channels and Modulation (Release 10)", 3GPP TS 36.211 V10.7.0, Feb. 2013, 1-101.
(Continued)

Primary Examiner — Brandon M Renner
Assistant Examiner — Abdeltif Ajid
(74) Attorney, Agent, or Firm — Murphy, Bilak & Homiller, PLLC

(57) ABSTRACT

According to one aspect of the teachings herein, a network node determines whether a wireless device is of a first type or a second type, with respect to "post-gap" subframes, and that determination is used, for example, to improve or otherwise adapt scheduling with respect to the wireless device, or with respect to other wireless devices. Additionally, or alternatively, the type determination is accounted for when configuring measurement gaps for the wireless device, or for other wireless devices. As noted, "post-gap" subframes in this context are those subframes immediately follow a measurement gap that is preceded by an uplink subframe or a special subframe. Further, wireless devices of the first type have no ability or a limited ability to transmit in post-gap subframes, whereas wireless devices of the second type have the ability to transmit in post-gap subframes.

22 Claims, 12 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2011/0116364 A1* | 5/2011 | Zhang | H04W 74/08 370/216 |
| 2013/0244719 A1 | 9/2013 | Nukala et al. | |
| 2014/0146697 A1* | 5/2014 | Kim | H04B 7/0413 370/252 |

OTHER PUBLICATIONS

3GPP, "3rd Generation Partnership Project; Technical Specification Group Radio Access Network; Evolved Universal Terrestrial Radio Access (E-UTRA); Physical layer procedures (Release 10)", 3GPP TS 36.213 V10.12.0, Mar. 2014, 1-127.

3GPP, "3rd Generation Partnership Project; Technical Specification Group Radio Access Network; Evolved Universal Terrestrial Radio Access (E-UTRA); Requirements for support of radio resource management (Release 10)", 3GPP TS 36.133 V10.14.0, Mar. 2014, 1-716.

3GPP, "3rd Generation Partnership Project; Technical Specification Group Radio Access Network; Evolved Universal Terrestrial Radio Access (E-UTRA); Requirements for support of radio resource management (Release 12)", 3GPP TS 36.133 V12.4.0, Jul. 2014, 1-870.

Unknown, Author, "UE Behaviour after Measurement Gap", 3GPP TSG-RAN WG4 Meeting #70bis, R4-142381, 36.133 CR 2268 Rev. 1, V 12.3.0, San Jose Del Cabo, Mexico, Mar. 31-Apr. 4, 2014, 1-3.

Unknown, Author, "UE Behaviour for Transmission due to Measurement Gaps", 3GPP TSG RAN WG4 Meeting #70bis, R4-141369, Ericsson, San Jose Del Cabo, Mexico, Mar. 31-Apr. 4, 2014, 1-2.

\* cited by examiner

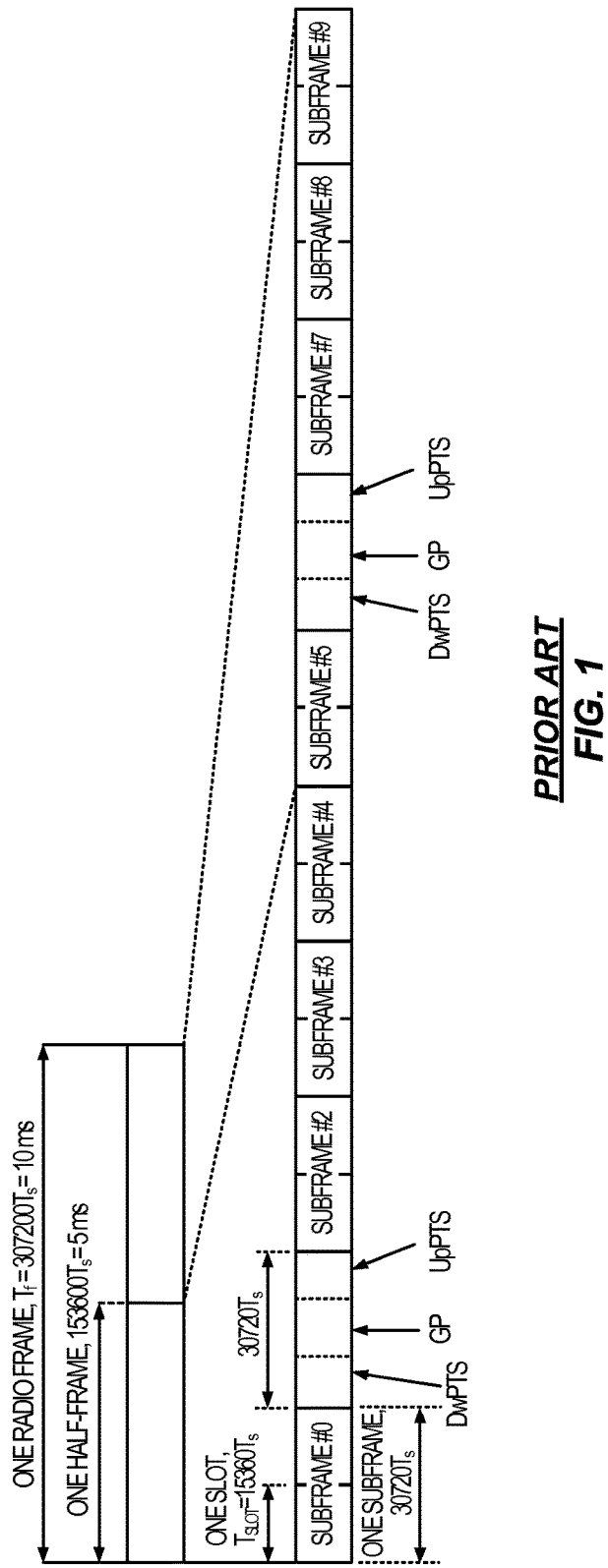
PRIOR ART
FIG. 1

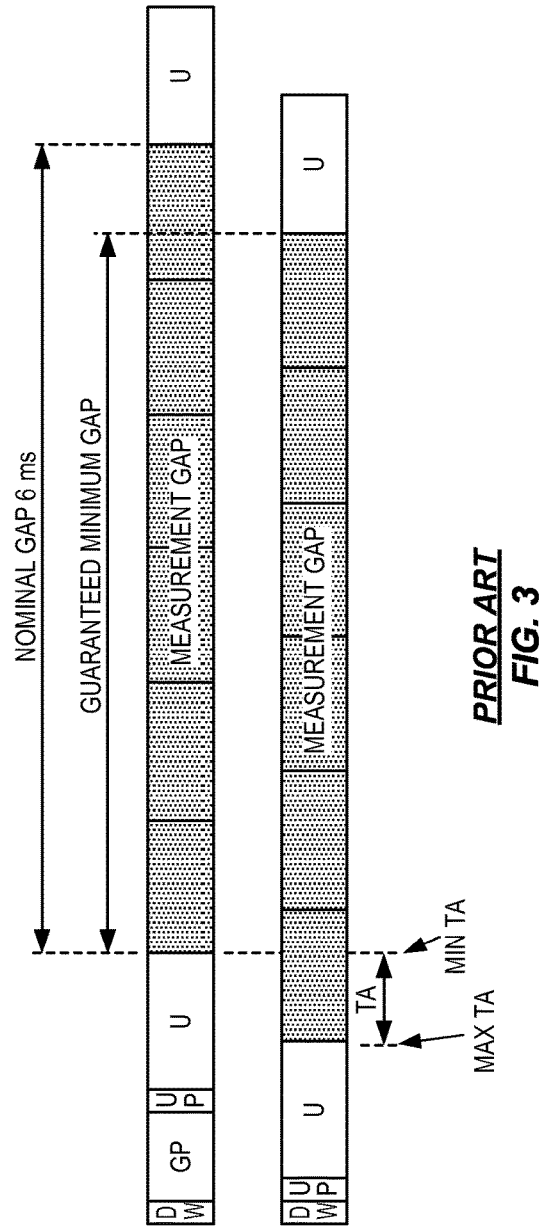
PRIOR ART
FIG. 2
PRIOR ART
FIG. 3

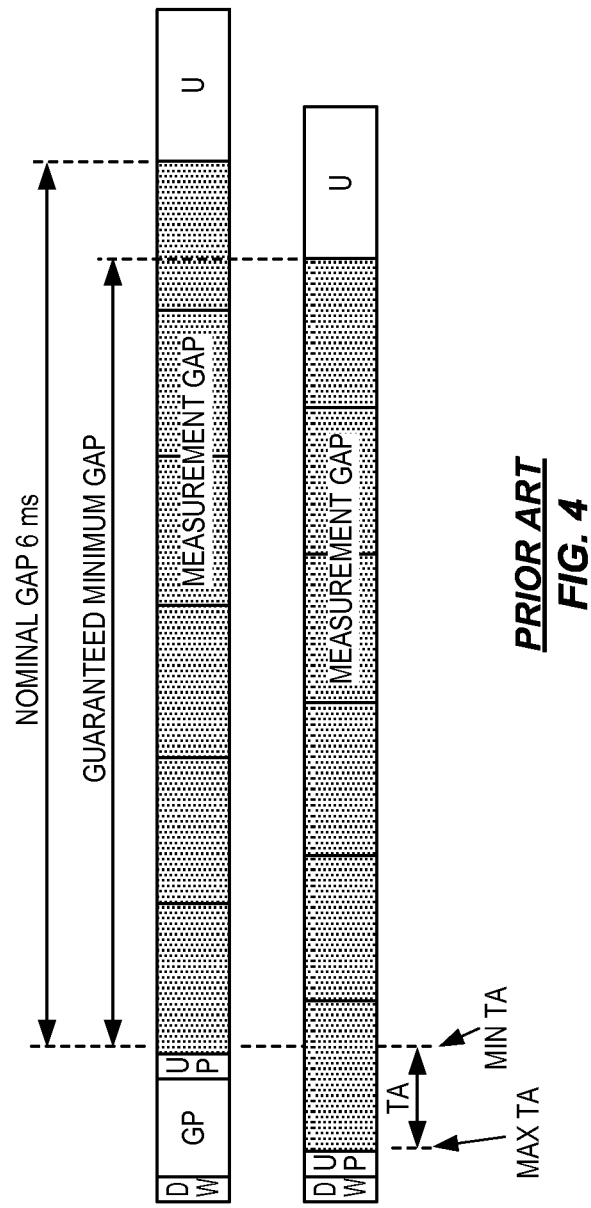
PRIOR ART
FIG. 4

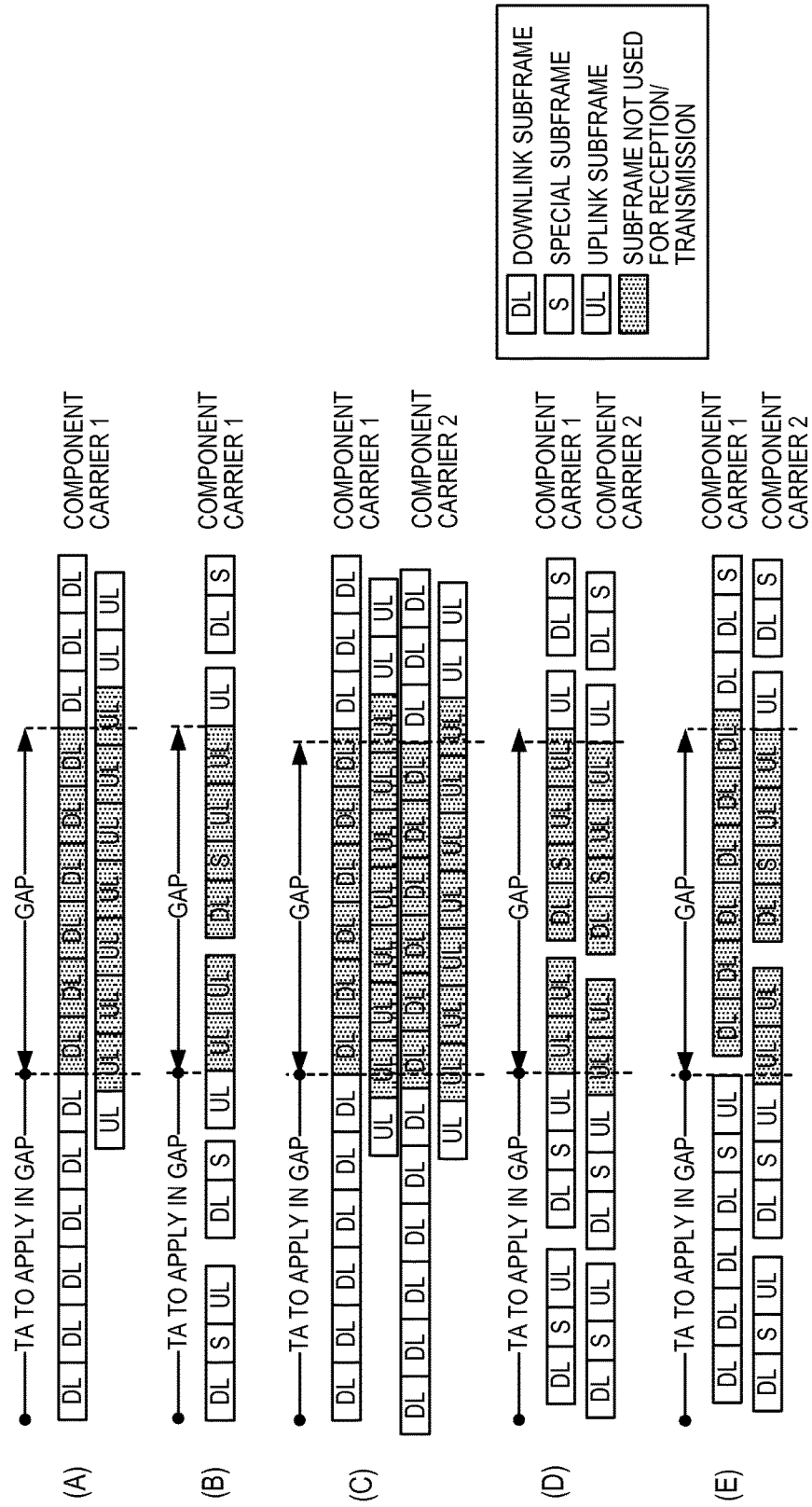
PRIOR ART
FIG. 5

| SCENARIO | DESCRIPTION | MINIMUM GAP WHEN NO TA COMMANDS ARE RECEIVED IMMEDIATELY BEFORE THE GAP | MINIMUM GAP WHEN TA IMMEDIATELY BEFORE, TO BE APPLIED DURING GAP | MITIGATION TO GUARANTEE MINIMUM 6ms GAP |
|---|---|---|---|---|
| A | SINGLE CARRIER FDD CELL | 6 ms | 6 ms (NO IMPACT SINCE FIRST UL AFTER GAP IS DROPPED) | NOTHING NEEDED |
| B | SINGLE CARRIER TDD CELL, UL/DL CONFIGURATION 0 | 6 ms | 6-4x0.0167=5.93 ms (4 TA COMMANDS MAY HAVE TO BE APPLIED DURING GAP) | DROP UL AFTER GAP |
| C | CA OF FDD CELLS; SINGLE TAG | 6-0.030=5.97 ms (UE SHALL HANDLE DL TIMING OFFSET OF UP TO 30.26 us BETWEEN PCELL AND SCELL(S)) | 5.97 ms (NO IMPACT SINCE FIRST UL AFTER GAP IS DROPPED) | DROP DL AFTER GAP |
| D | DL & UL CA OF TDD CELLS WITH SAME CONFIGURATION, UL/DL CONFIGURATION 0 | 6-0.032=5.97 ms (TA DIFFERENCE BETWEEN MULTIPLE TAGs SHALL BE AT MOST 32.47 us) | 5.97-4x0.0167=5.90 ms (4 TA COMMANDS MAY HAVE TO BE APPLIED DURING GAP, AND HENCE SHORTEN IT) | DROP UL AFTER GAP |
| E | DL & UL CA OF TDD CELLS WITH DIFFERENT CONFIGURATION, UL/DL CONFIGURATIONS 0 AND 5 RESPECTIVELY | 6-0.032=5.97 ms (TA DIFFERENCE BETWEEN TAGs SHALL BE AT MOST 32.47 us) | 5.97-4x0.0167=5.90 ms (4 TA COMMANDS MAY HAVE TO BE APPLIED DURING GAP, AND HENCE SHORTEN IT) | DROP UL AFTER GAP |

*PRIOR ART*
*FIG. 6*

| CQI INDEX | MODULATION | CODE RATE x 1024 | EFFICIENCY |
|---|---|---|---|
| 0 | | OUT OF RANGE | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

*PRIOR ART*
*FIG. 7*

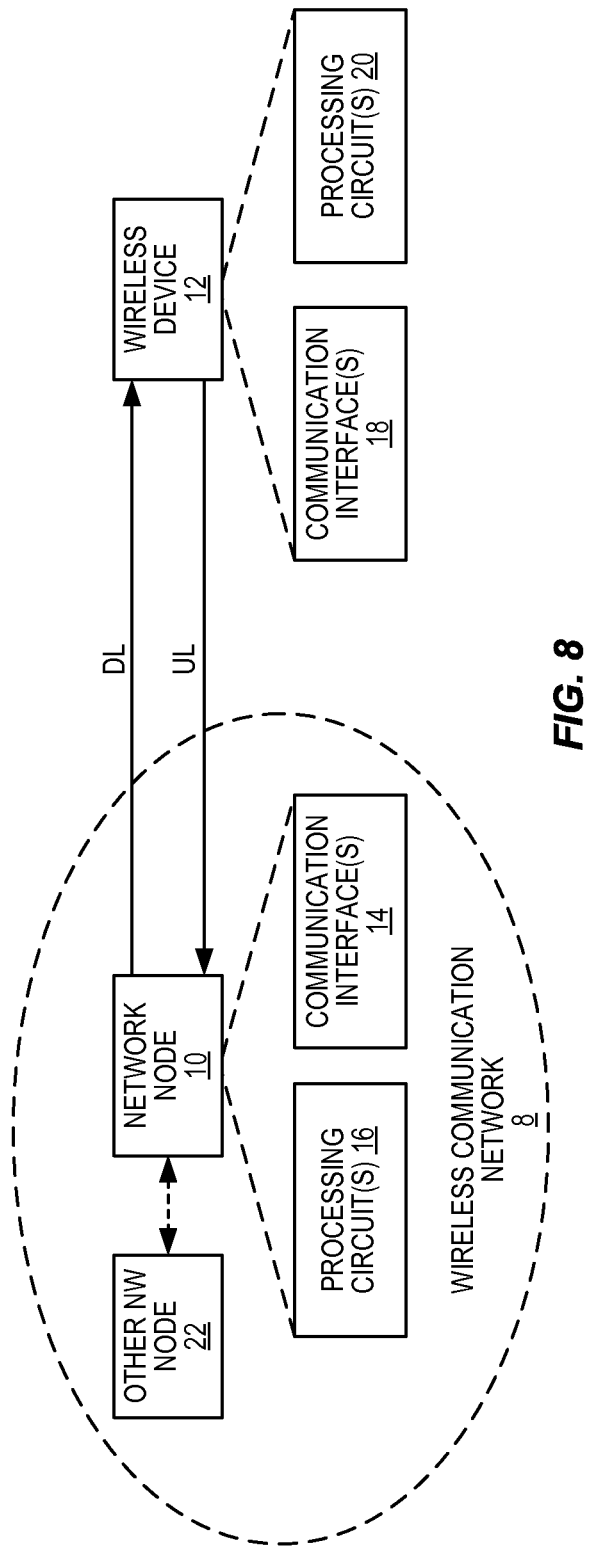
FIG. 8

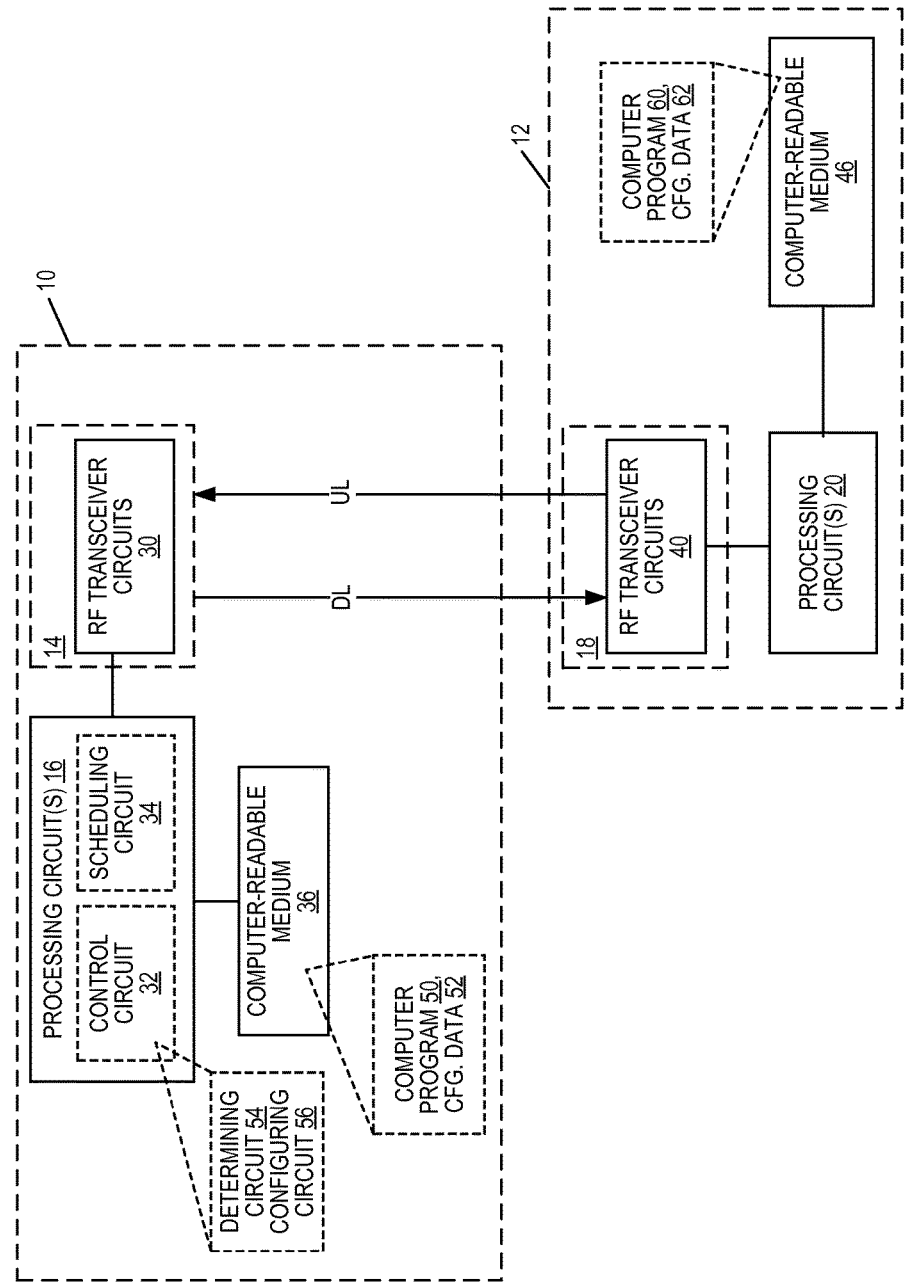
FIG. 9

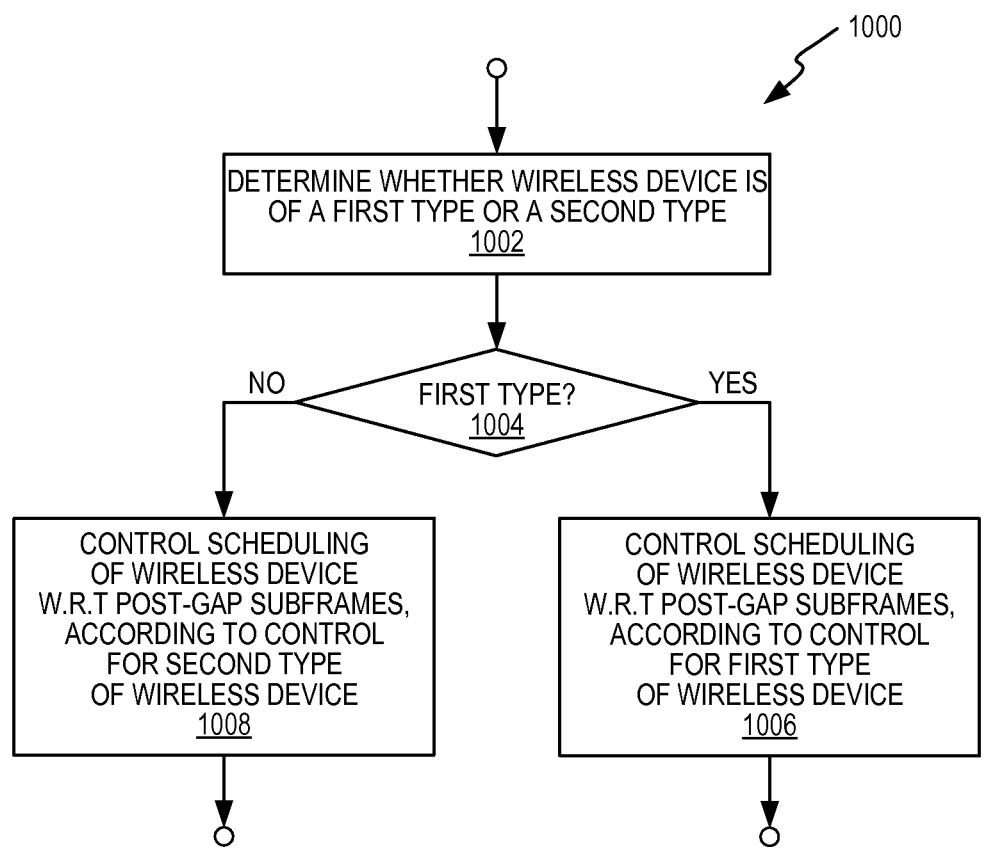
FIG. 10

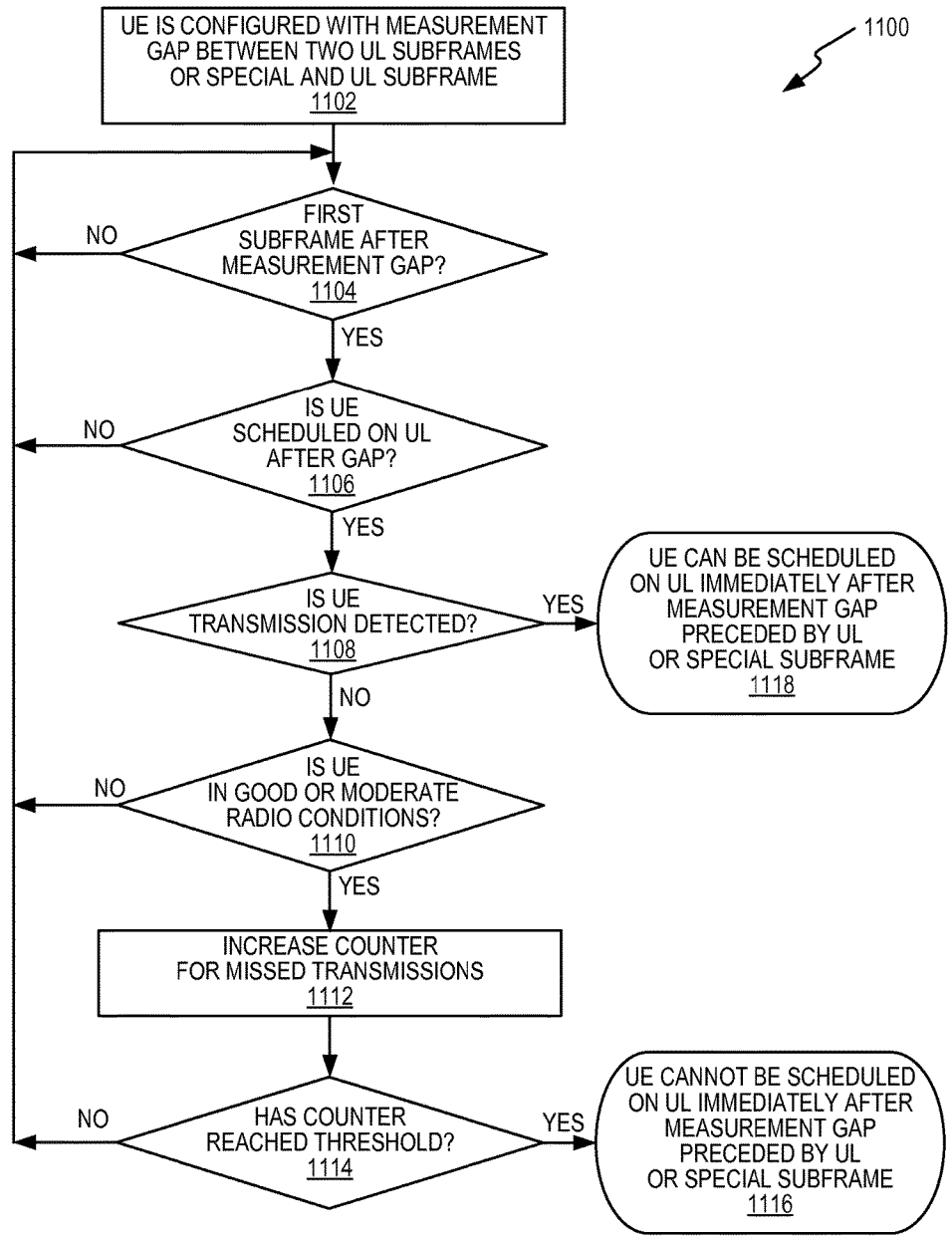
*FIG. 11*

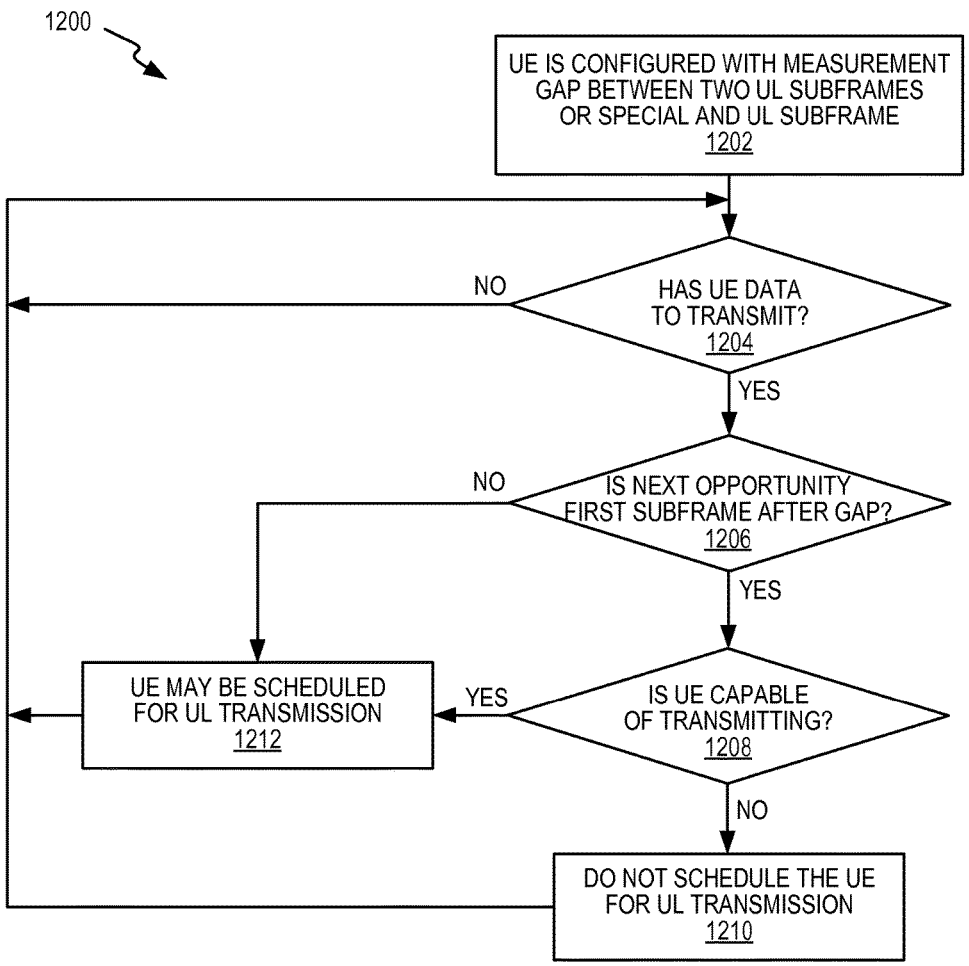
FIG. 12

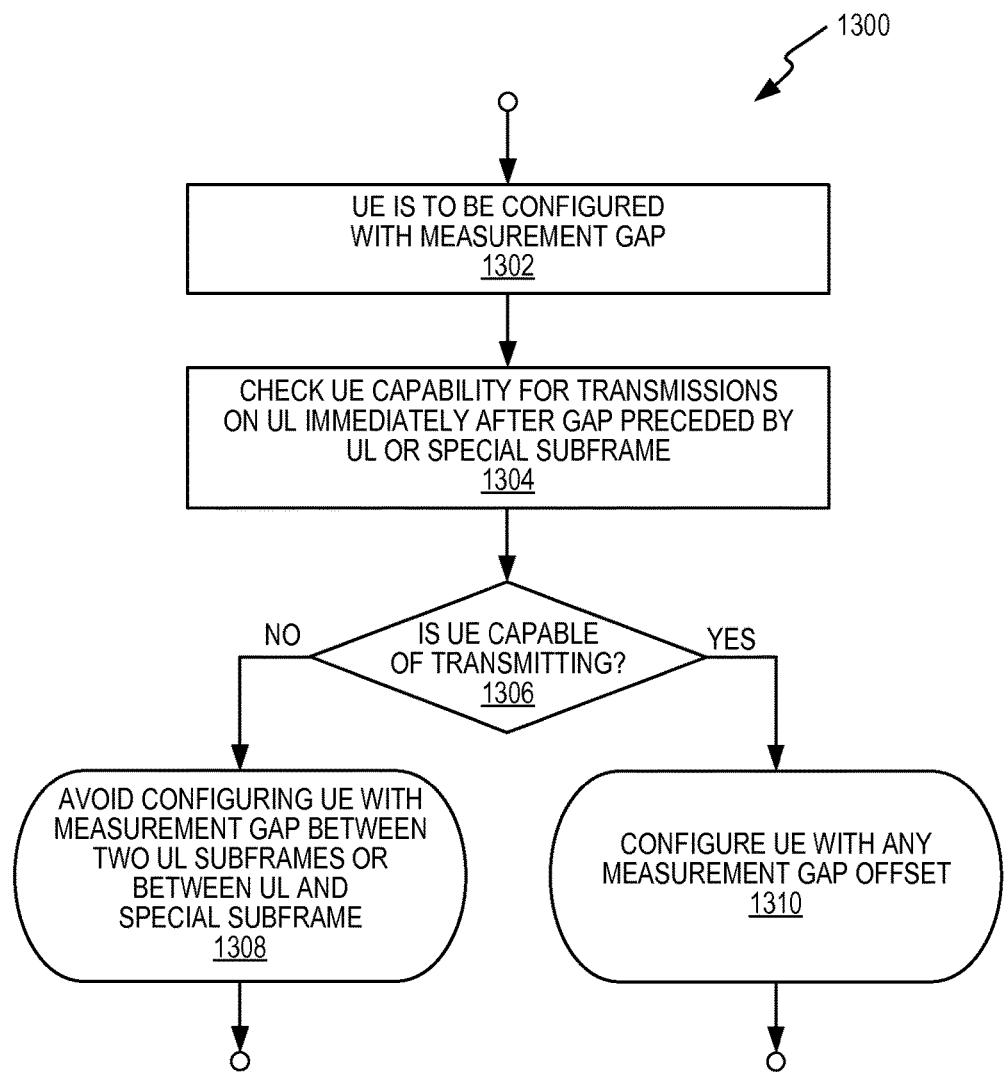
FIG. 13

METHOD AND APPARATUS FOR SCHEDULING OF A WIRELESS DEVICE

RELATED APPLICATIONS

This application claims priority under 35 U.S.C. § 119 from the U.S. provisional application filed on 3 Apr. 2014 and assigned App. No. 61/974,837, which application is incorporated herein by reference.

BACKGROUND

Communication networks use "timing advance", also denoted as "TA", to adjust the uplink transmission timing of individual wireless terminals. These TA adjustments ensure that the uplink, UL, transmissions from different terminals are aligned in time at the involved network receivers. Aligning the different UL transmissions in time at the network receiver(s) preserves orthogonality in the UL direction.

In the context of wireless communication networks based on Long Term Evolution, LTE, standards as promulgated by the Third Generation Partnership Project or 3GPP, the wireless terminals are referred to as user equipments or UEs, and the involved radio network nodes are a type of base station referred as an "evolved NodeB" or "eNB". The transmit timing of the UEs under the control of the same eNB should be adjusted to ensure that the UL signals transmitted by them arrive at the eNB with the same time alignment.

More specifically, the UL signals from the different UEs should arrive well within the cyclic prefix or CP. The "normal" CP length is about 4.7 μs. This alignment ensures that the eNB receiver is able to use the same resources (i.e. same Discrete Fourier Transform, DFT, or Fast Fourier Transform, FFT resource) to receive and process the signals from multiple UEs.

The eNB maintains the required UL timing alignment of the UEs under its control by sending TA commands to the individual UEs. In turn, the TA commands generated for a particular UE depend on measurements made by the eNB with respect to UL transmissions received from the UE. For example, the eNB measures two-way propagation delay or round trip time, RTT, for a particular UE to determine the TA value required for the UE. Here, the TA value or command represents a negative offset at the UE between the start of a received downlink subframe and a transmitted UL subframe. By varying the particular offset used by a particular UE, the eNB compensates for the different propagation delays between it and respective ones of the UEs under its control, and thus keeps all of the UEs synchronized to the same downlink/uplink frame/subframe timing used on the air interface.

For a TA command received by a given UE on subframe n, the corresponding adjustment of the UL transmission timing shall by applied by the UE from the beginning of subframe n+6. The TA command indicates the change in UL timing relative to the current UL timing of the UE transmission as multiples of 16 Ts, where Ts=32.5 ns and is referred to as the basic time unit in LTE.

In the case of a random access response, an 11-bit TA command, $T_A$, for a timing advance group or "TAG" indicates $N_{TA}$ values by index values of $T_A$=0, 1, 2, ..., 1282, where an amount of the time alignment for the TAG is given by $N_{TA}=T_A \times 16$, and where $N_{TA}$ is defined below. In other cases, a 6-bit TA command, $T_A$, for a TAG indicates adjustment of the current $N_{TA}$ value, $N_{TA,old}$, to the new NTA value, $N_{TA,new}$, by index values of $T_A$=0, 1, 2, ..., 63, where $N_{TA,new}=N_{TA,old}+(T_A-31) \times 16$. Here, adjustment of the $N_{TA}$ value by a positive or a negative amount indicates advancing or delaying the UL transmission timing for the TAG by a given amount, respectively.

Timing advance updates are signaled by an eNB to a UE in Medium Access Control, MAC, Protocol Data Units, PDUs.

In another aspect of wireless terminal operations, a given UE or other wireless terminal typically performs inter-frequency and inter-RAT, Radio Access Technology, measurements during so called "measurement gaps", unless the UE is capable of performing measurements without gaps. A measurement gap in this context is a time period during which the UE is not scheduled for reception and/or transmission by the network and where, correspondingly, the UE can use its receiver circuitry to make signal measurements on other frequencies and/or with respect to other RATs.

For UEs that require measurement gaps to make and report inter-frequency and inter-RAT measurements, the network node must determine the particular measurement gap configuration to be used by the UE. The LTE standards define two periodic measurement gap patterns, each having a measurement gap length of 6 ms. The first pattern, denoted as pattern #0, has a repetition period 40 ms, whereas the second pattern, denoted as pattern #1, has a repetition period of 80 ms. The measurements performed by the UE are then reported to the network, which uses them for various tasks.

LTE provides the following possible measurements by a UE during its configured measurement gaps: (a) inter-frequency cell detection or cell identification; (b) inter-frequency RSRP measurement, where RSRP denotes Reference Signal Received Power; (c) inter-frequency RSRQ measurement, where RSRQ denotes Reference Signal Received Quality; (d) inter-frequency RSTD, where RSTD denotes Reference Signal Time Difference; (e) inter-RAT cell identification, e.g., identification of any one or more of GSM/GERAN, WCDMA, UTRA TDD, and CDMA2000 networks; and (f) various inter-RAT measurements, such as Common Pilot Channel, CPICH, Received Signal Code Power, RSCP, CPICH Carrier-to-Noise ratio, Ec/No, and GSM carrier Received Signal Strength Indicator or RSSI.

The measurement gaps are used in all duplex modes of operation, which include Frequency Duplex Division or FDD, Time Division Duplex or TDD, and Half-Duplex FDD or HD-FDD. In HD-FDD, the UL and downlink, DL, transmissions take place on different paired carrier frequencies but not simultaneously in time in the same cell. The use of HD-FDD therefore means that the UL and DL transmissions take place in different time resources, e.g., different symbols, time slots, subframes or frames. In other words, the UL and DL subframes do not overlap in time. The number and location of subframes used for DL, UL or unused subframes can vary on the basis of frame or multiple of frames.

The air interface in LTE networks is referred to as E-UTRA, denoting Evolved UMTS Terrestrial Radio Access, where UMTS denotes Universal Mobile Telecommunications System. TDD operation in E-UTRA specifies measurement gaps with particular subframe offsets, which are best understood with reference to FIG. 1, depicting a "Type 2" frame structure for TDD operation, based on a 5 ms "switch point" periodicity between DL and UL subframes. Correspondingly, FIG. 2 illustrates the defined UL/DL configurations defined in LTE for TDD operation.

In the table of FIG. 2, "D" denotes a DL subframe, "U" denotes an UL subframe, and "S" denotes a "Special"

subframe that includes both DL and UL portions. The structure of these special subframes is seen in FIG. 1, where "DwPTS" denotes the DL portion of the subframe, "UpPTS" denotes the UL portion of the subframe, and "GP" denotes a Guard Portion or Guard Period between the DL and UL portions.

FIG. 3 illustrates, that for UL/DL Configuration #0, measurement gaps with offsets of 3 and 8 subframes relative to the frame border are squeezed in between two uplink subframes. FIG. 4 illustrates, that for UL/DL Configurations #0, #1 and #6, measurement gaps with offsets of 2 and 7 subframes are squeezed in between a special subframe and an UL subframe.

These observations are notable with respect to the assumptions underlying the defined measurement gap configurations and their associated timings. Namely, one of the assumptions made when defining existing UE behavior for measurement gaps was that the measurement gap was to be defined with respect to the DL timing. That is, measurement gaps were to be aligned with DL subframes. Moreover it was assumed that transmissions overlapping the measurement gap were to be dropped.

In particular, the 3GPP technical specification TS 36.133 V10.14.0, section 8.1.2, defines the following UE (E-UTRAN corresponds to LTE) behavior: in the uplink subframe occurring immediately after the measurement gap, the E-UTRAN FDD UE shall not transmit any data, and the E-UTRAN TDD UE shall not transmit any data if the subframe occurring immediately before the measurement gap is a downlink subframe. This second provision covers LTE TDD operation, but does not cover the case when the measurement gap is positioned between two uplink subframes, or between a special subframe and an uplink subframe.

This omission might be justified if considering only the autonomous change of timing, where the UE is allowed to autonomously change its transmit timing by at most $17.5 \times T_s$ (0.57 μs) per 200 ms, where $T_s$ is the basic unit of time in LTE, provided that it is not the first transmission after Discontinuous Reception (DRX). The relative position of the gap would differ because it is defined from UL timing instead of DL timing, but the length would be 6 ms, as required.

In a practical implementation at some point in time the UE has to plan for switching the radio receiver from intra-frequency to inter-frequency, and later back again. Additionally, the UE may need to plan for when to carry out automatic gain control, when to start recording In-phase/Quadrature, I/Q, samples for offline processing, and/or configuring hardware accelerators for online processing, and/or configuring software for control and processing.

Suppose that this planning is done, say, less than 200 ms in advance. In that case, the autonomous change of timing would potentially result in that measurement gap timing at the UE would move at most ±0.6 μs, for measurement gaps that are positioned between uplink activities. This could be compensated for by removing 0.6 μs from the beginning and the end of the measurement gap, as a margin for the change in gap position. The impact would be negligible.

When taking TA commands into account, however, the situation becomes somewhat more problematic. TA adjustments have no impact on the measurement gaps that are covered by the discussion above, because their positions are determined by the DL timing. However, commanded changes in UL timing via the TA mechanism may have a large impact on the measurement gaps whose positions are determined by the UL timing of the UE.

Although not very likely, it is possible that a UE receives one TA command every DL or special subframe, with each such TA command to be applied by the UE four subframes later. Each such TA command may change the UL timing within the range $-31 \times 16T_s$ to $32 \times 16T_s$ (about ±17 μs). If one assumes that the aforementioned planning is done 20 ms in advance, it would mean that the maximum timing change would be about ±180 μs for UL/DL Configuration #1. How much of this that actually can be applied depends on the size of the guard period in the involved special subframe configuration and on the aggregated timing advance at the time when the planning is carried out, because the aggregated timing advance is bounded.

If the uncertainty in measurement gap positioning here is handled in the same manner as described above for autonomous UL timing changes made by the UE, the worst-case reduction of the measurement gap would be about 0.36 ms. This reduction value reflects the fact that the UE has to plan for the maximum of the aggregated TA change in either direction, 20 ms in advance. Reducing or shrinking the measurement gap by that amount would compensate for the uncertainty but it would also leave too little radio time for the gap to be useful for cell search and measurements.

FIG. 5 illustrates minimum guaranteed measurement gaps for the following scenarios: (A) FDD single component carrier, 3GPP TS Rel.8 and onwards; (B) TDD single component carrier, 3GPP TS Rel.8 and onwards; (C) FDD CA, 3GPP TS Rel.10 and onwards; (D) TDD CA with same UL/DL allocation on both carriers, 3GPP TS Rel.10 and onwards for single TAG, and 3GPP TS Rel.11 and onwards for multiple TAGs—the case where the 6ms long measurement gap is positioned between two UL subframes is considered; and (E) TDD CA with different UL/DL allocation on the carriers, 3GPP TS Rel.11 and onwards—the requirement of being able to aggregate carriers with different UL/DL configurations is still under discussion, and the case when the 6ms long measurement gap is positioned between two UL subframes is considered.

In particular, in the context of FIG. 5, TA commands received during the 6 subframes before a measurement gap will modify the length of the measurement gap. The figure uses shaded subframes to depict those subframes where no serving cell transmission or reception is to be carried out under existing rules. FIG. 6 illustrates several known mitigations for guaranteeing a minimum measurement gap length of 6 ms, both with and without the involved UE having received a TA command before the gap.

It has also been suggested that a UE may skip transmissions in the UL subframe following immediately after a measurement gap, should the gap be preceded by an UL subframe or a special subframe, where such subframe formats are defined in 3GPP TS 36.211. In particular, for example special subframe definitions, see 3GPP TS 36.211 V10.7.0, section 4.2. This approach, however, is in tension with the preexisting assumption by eNBs that a given UE may always be scheduled immediately after a measurement gap.

Other factors to consider include the fact that it is unlikely that a UE will receive four consecutive maximum TA adjustments within a measurement gap period. Further, note that a DL subframe immediately following a measurement gap can be used for data reception in any case. Of further note is whether the subframe occurring immediately before a measurement gap is an UL subframe. In general, whether or not a UE, e.g., the particular UE implementation may dictate whether or not a UE operating according to an E-UTRAN TDD configuration, can transmit data in an UL subframe immediately following a measurement gap.

In terms of the types of signal measurements that can be reported, FIG. 7 illustrates a known Channel Quality Indicator, CQI, table, which shows the mapping defined between CQI values or indexes, and corresponding Modulation and Coding Schemes, MCSs. One sees that higher-order modulations and more efficient encodings can be used with higher CQIs. A given UE may be configured to periodically report CQI to its supporting network. Thus, a scheduler associated with or included in a supporting eNB may use CQI reports for link adaptation.

For LTE TDD, the reporting period can be: 1, 5, 10, 20, 40, 80, and 160 ms, respectively, and with some restrictions on the UL/DL configuration in use. See, e.g., 3GPP TS 36.213 V10.12.0, section 7.2.2. A typical network configuration uses a reporting period in the range of 5-40 ms. The reporting may also be aperiodic by which the UE receives an indication in Downlink Control Information or DCI that it shall send a CQI report to the eNodeB.

SUMMARY

According to one aspect of the teachings herein, a network node determines whether a wireless device is of a first type or a second type, with respect to "post-gap" subframes, and that determination is used, for example, to improve or otherwise adapt scheduling with respect to the wireless device, or with respect to other wireless devices. Additionally, or alternatively, the type determination is accounted for when configuring measurement gaps for the wireless device, or for other wireless devices. As noted, "post-gap" subframes in this context are those subframes immediately follow a measurement gap that is preceded by an uplink subframe or a special subframe. Further, wireless devices of the first type have no ability or a limited ability to transmit in post-gap subframes, whereas wireless devices of the second type have the ability to transmit in post-gap subframes.

In an example embodiment, a network node is configured for operation in a wireless communication network, and it includes a communication interface configured for communicating with at least one of: another network node of a same or different type; and a wireless device operating within the wireless communication network. The network node further includes a processing circuit that is configured to determine whether the wireless device is of a first type or a second type with respect to post-gap subframes, and to control scheduling of the wireless device with respect to post-gap subframes, in dependence on whether the wireless device was determined to be of the first type or of the second type.

Another embodiment involves a method of operation in a network node that is configured for operation in a wireless communication network that provides communication services to wireless devices. The method includes determining whether a wireless device is of the first type or the second type, and controlling scheduling of the wireless device with respect to post-gap subframes in dependence on whether the wireless device was determined to be of the first type or the second type.

Of course, the present invention is not limited to the above features and advantages. Those of ordinary skill in the art will recognize additional features and advantages upon reading the following detailed description, and upon viewing the accompanying drawings.

BRIEF DESCRIPTION OF THE DRAWINGS

FIG. 1 is a diagram of an example radio frame and its constituent subframes.

FIG. 2 is a table of example Uplink, UL, and Downlink, DL, configurations.

FIG. 3 is a diagram illustrating measurement gap alignments at offsets of three and eight subframes, for UL/DL Configuration 0 from the table seen in FIG. 2.

FIG. 4 is a diagram illustrating measurement gap alignments at offsets of two and seven subframes, for UL/DL Configuration 0, 1 and 6 from the table seen in FIG. 2.

FIG. 5 is a diagram illustrating example minimum guaranteed measurement gap lengths and associated mitigations.

FIG. 6 is a table illustrating an analysis of example, minimum guaranteed measurement gaps, with and without Timing Advance, TA, commands received before the gap, and corresponding mitigations to guarantee a minimum gap length of six milliseconds.

FIG. 7 is a table illustrating example CQI values in accordance with 3GPP TS 36.213 V10.12.0, section 7.2.3.

FIG. 8 is a block diagram of one embodiment of a wireless communication network having one or more network nodes configured for operation according to the teachings herein.

FIG. 9 is a block diagram of one embodiment of a network node and one embodiment of a wireless device, according to the teachings herein.

FIG. 10 is a logic flow diagram of one embodiment of a method of processing at a network node, for controlling scheduling of a wireless device with respect to measurement gaps.

FIG. 11 is a logic flow diagram for one embodiment of a method of determining whether a wireless device is of a first type having no ability or only a limited ability to transmit in post-gap subframes, or a second type having the ability to transmit in post-gap subframes.

FIG. 12 is a logic flow diagram of another embodiment of a method of processing at a network node, for controlling scheduling of a wireless device with respect to measurement gaps.

FIG. 13 is a logic flow diagram for one embodiment of a method of assigning a measurement gap configuration to a wireless device, in dependence on whether the wireless device is of a first type having no ability or only a limited ability to transmit in post-gap subframes, or a second type having the ability to transmit in post-gap subframes.

DETAILED DESCRIPTION

FIG. 8 is a block diagram depicting a wireless communication network 8 in simplified form, which network 8 comprises, by way of non-limiting example, a 3GPP LTE network. FIG. 8 further illustrates a network node 10 as contemplated according to some embodiments herein. By way of non-limiting example, the network node 10 comprises an eNB or other radio base station configured for operation in the network 8. In such an example, the network node 10 serves wireless devices 12 operating in one or more cells or other coverage areas of the network 8 that are associated with the network node 10. One wireless device 12 is shown by way of example, and in a non-limiting example case, the wireless device 12 comprises a 3GPP UE, e.g., an LTE-based mobile terminal.

Those of ordinary skill in the art will appreciate that FIG. 8 illustrates functional and/or physical circuit arrangements and that the network node 10 and the wireless device 12 generally will include digital processing circuits and associated memory or other computer-readable medium for storing configuration data, operational or working data, and for storing computer program instructions. In at least some of the embodiments contemplated herein, the network-side and device-side functionality is realized at least in part based on the programmatic configuration of digital processing circuitry, based on the execution by that circuitry of stored computer program instructions.

In the illustration, the example network node 10 includes one or more communication interfaces 14 and one or more processing circuits 16, which are operatively associated with the communication interfaces 14, e.g., for performing transmission of signaling and data on the downlink, DL, to wireless devices 12 via radio transceiver circuits included in the communication interface(s) 14, and for receiving signaling and data from wireless devices 12 on the uplink, UL, via the radio transceiver circuits. Such circuitry includes one or more transmitters and receivers, e.g., cellular radio circuits, along with power control and associated signal processing. The one or more communication interfaces 16 in this scenario include, e.g., inter-base-station interfaces and/or backhaul or other Core Network, CN, communication interfaces.

As previously noted, the wireless device 12 may be a cellular radiotelephone—such as a smartphone, feature phone, etc.—or may be a network adaptor, card, modem or other such interface device. Further examples include a tablet, laptop computer or other such device with wireless communication capabilities. The example wireless 12 as shown in FIG. 8 includes one or more communication interfaces 18 and one or more processing circuits 20. The processing circuits 20 are operatively associated with the communication interface(s) 18, e.g., for performing transmission of signaling and data on the UL to the network node 10 via radio transceiver circuits included in the communication interface(s) 18, and for receiving signaling and data from network node 10 on the DL via the radio transceiver circuits. Additionally, or alternatively, the communication interface(s) support Device-to-Device, D2D, communications with one or more other wireless devices 12.

Those of ordinary skill in the art will appreciate that radio frequency, RF, transceiver circuits respectively included in the example network node 10 and wireless device 12 may include a mix of analog and digital "front-end" circuits, which operate on antenna-received signals to produce one or more corresponding streams of digital signal samples. Digital Signal Processors, DSPs, and/or other baseband processing circuits process the digital signal samples, e.g., by applying linearization and symbol detection/decoding, for recovering the transmitted information.

FIG. 9 provides further example details for the network node 10 and the wireless device 12 in one embodiment. FIG. 9 provides an explicit example where the communication interface(s) 14 of the network node 10 comprise RF transceiver circuits 30. One further sees that the associated one or more processing circuits 16 at least functionally include a control circuit 32 and a scheduling circuit 34. The network node 10 further includes, at least in some embodiments, a non-transitory computer-readable medium or media 36.

Similarly, the communication interface(s) 18 of the wireless device 12 comprise RF transceiver circuits 40. One further sees in the example embodiment that the associated one or more processing circuits 20 include, or are associated with, a non-transitory computer-readable medium or media 46.

It will be appreciated that the processing circuit(s) 16 of the network node 10 and/or the processing circuits 20 of the wireless device 12 may be implemented using fixed circuitry or programmed circuitry, or a mix of both fixed and programmed circuitry. In one or more example embodiments, the computer-readable medium 36 of the network node 10 stores a computer program 50 and configuration data 52. The computer-readable medium 36 comprises, for example, one or more memory circuits or devices, such as FLASH, EEPROM, or solid state disk, and it will be understood that such circuitry provides non-transitory storage for the computer program 50 in embodiments in which the processing circuit(s) 16 are at least partially configured to carry out the network-side teachings herein based on execution of computer program instructions comprising the computer program 50.

In a corresponding example configuration, the processing circuit(s) 16 comprise one or more microprocessors, DSPs, ASICs, FPGAs, or other digital processing circuitry that is programmatically configured to implement the functions or operations set forth herein at least in part based on the execution of the computer program 50. In a more detailed example, the processing circuit(s) 16 comprise one or more microprocessors, DSPs, ASICs, FPGAs, or other digital processing circuitry that is programmatically configured to implement the functions or operations set forth herein at least in part based on the execution of the computer program 50. In other embodiments, the processing circuit(s) 16 comprises fixed circuitry, while in other embodiments, the processing circuit(s) 16 comprises a mix of programmed and fixed circuitry. However implemented, in an example embodiment the control circuit 32 at the network node 10 at least functionally includes a determining circuit 54 and a configuring circuit 56. Similarly, the configuration of the wireless device 12 and its associated operating behavior can be configured at least in part based on the execution of computer-program instructions in the computer program 60 and configuration data 62, stored in the computer-readable medium 46 of the wireless device 12.

Consider an example configuration according to an embodiment, wherein the network node 10 is configured for operation in a wireless communication network 8 and its included communication interface 14 is configured for communicating with at least one of: another network node of a same or different type; and a wireless device 12 operating within the wireless communication network 8. See, e.g., FIG. 8, which depicts the network node 10 having a communication link to one or more other network nodes 22, which may be of the same node type or of a different node type.

The processing circuit 16 of the network node 10 is configured to determine whether the wireless device 12 is of a first type or a second type with respect to post-gap subframes. Here, a "post-gap subframe" is a subframe that immediately follows a measurement gap that is preceded by an uplink subframe or a special subframe. Further, wireless devices 12 of the "first type" are those having no ability or a limited ability to transmit in post-gap subframes, whereas wireless devices 12 of the "second type" are those having the ability to transmit in post-gap subframes. These particular subframes are problematic with respect to scheduling at least some wireless devices. Advantageously, the processing circuit 16 is further configured to control scheduling of the wireless device 12 with respect to post-gap subframes, in dependence on whether the wireless device 12 was determined to be of the first type or of the second type.

The aforementioned determining circuit 54 may be configured to make the determination as to whether any given wireless device 12 is of the first type or of the second type and to provide an indication of that determination to the scheduling circuit 34. In some embodiments, the scheduling circuit 34 in turn then controls scheduling for the wireless device 12 in dependence on whether the device was determined to be of the first type or of the second type.

However its functional and/or physical circuit arrangement is realized, the processing circuit 16 in at least some embodiments is configured to determine whether a wireless device 12 is of the first or the second type, based on obtaining type information from the other network node 22, or from a database, that is in or accessible to the network node 10. For example, the configuration data 52 seen in FIG. 9 includes the database in one or more embodiments.

In other embodiments, or in the same embodiments, such as where database information is not available for a given wireless device 12, the processing circuit 16 is configured to determine whether the wireless device 12 is of the first type or the second type based on observing, one or more times, whether the wireless device 12 successfully performs a scheduled uplink transmission in a post-gap subframe, or, despite having acceptable radio conditions, fails to perform the scheduled uplink transmission in the post-gap subframe.

Similarly, in the same or other embodiments, as part of determining whether the wireless device 12 is of the first type or the second type, the processing circuit 16 is configured to deem the wireless device 12 to be of the first type, responsive to observing a defined number of scheduled uplink transmission failures for the wireless device 12 with respect to scheduled uplink transmissions in corresponding post-gap subframes. Here, the "failures" arise, for example, because the wireless device 12 is not capable of performing the scheduled UL transmissions in post-gap subframes.

In some embodiments, the processing circuit 16 is configured to control a measurement gap configuration of the wireless device 12 in dependence on whether the wireless device 12 is determined to be of the first type or the second type. For example, the configuring circuit 56 within the processing circuit 16, as seen FIG. 9, may be configured to control the measurement gap configuration of the wireless device 12, in dependence on the determination of whether the wireless device 12 is determined to be of the first type or of the second type.

In at least one such embodiment, the processing circuit 16 is configured to assign a measurement gap configuration to the wireless device 12 that avoids or reduces the occurrence of post-gap subframes for the wireless device 12, in response to determining that the wireless device 12 is of the first type. The processing circuit 16 also may be configured to assign a measurement gap configuration to the wireless device 12 that does not avoid post-gap subframes, in response to determining that the wireless device 12 is of the second type. In general, in one or more embodiments, the processing circuit 16 controls measurement gap configuration assignments for any given plurality of wireless devices 12, so that, subject to any constraints on the measurement gap configuration assignments, those wireless devices 12 among the given plurality of wireless devices 12 that are determined to be of the first type are assigned measurement gap configurations that avoid or reduce the occurrence of post-gap subframes for those wireless devices 12 that are determined to be of the first type.

It was also noted above that scheduling for a wireless device 12 may be adapted or controlled in dependence on determining whether the wireless device 12 is of the first type or of the second type. In at least one embodiment, the processing circuit 16 is configured to, in response to determining that the wireless device 12 is of the first type having a limited ability to transmit in post-gap subframes, control scheduling of the wireless device 12 by scheduling the wireless device 12 with a signal that is transmitted at the end of the post-gap subframe and/or with a signal associated with a robust transport format.

In the same or other embodiments, the processing circuit 16 is configured to transmit capability information for the wireless device 12 to another network node 22, where the capability information indicates whether the wireless device 12 is of the first type or the second type. The other node is, as a non-limiting example, another base station in the network 8.

FIG. 10 illustrates a method of operation in a network node, such as the aforementioned network node 10. The node here is configured for operation in a wireless communication network 8 that provides communication services to wireless devices 12, and the method 1000 includes determining (Block 1002) whether a wireless device 12 is of a first type or a second type. As before, wireless devices 12 of the first type have no ability or a limited ability to transmit in a post-gap subframe which is any uplink subframe that immediately follows a measurement gap that was preceded by an uplink subframe or a special subframe, whereas wireless devices 12 of the second type have the ability to transmit in post-gap subframes.

The method 1000 further includes controlling (Blocks 1004, 1006, 1008) scheduling of the wireless device 12 with respect to post-gap subframes in dependence on whether the wireless device 12 was determined to be of the first type or the second type. For example, if the wireless device 12 is determined to be of the second type (NO from Block 1004), scheduling for the wireless device 12 is controlled according to the control used for devices of the second type (Block 1008). Conversely, if the wireless device 12 is determined to be of the first type (YES from Block 1004), scheduling for the wireless device 12 is controlled according to the control used for devices of the first type (Block 1006).

FIG. 11 illustrates another method contemplated herein, and it can be understood as one example of implementing the first-type/second-type determination performed in the method 1000. Here, a wireless device 12—denoted as "UE" in the figure—has been configured with a measurement gap offset that results in the gap being positioned between two UL subframes, or between a special subframe and an UL subframe (Block 1102). The particular measurement gap offset may have been selected by the network node 10 for the purpose of probing whether the wireless device 12 is capable of transmitting immediately after the gap, but may also have been chosen by happenstance or according to some other objective or for some other reason.

The network node 10 determines whether the current subframe is the first subframe after a measurement gap for the wireless device 12 (Block 1104). If it is the first subframe after the gap (YES from Block 1104), and the wireless device 12 is scheduled by the network node 10 for UL transmissions (YES from Block 1106), and the network node 10 successfully receives or detects a post-gap UL transmission by the wireless device 12 (YES from Block 1108), then the network node 10 concludes that the UE can be scheduled in post-gap subframes (Block 1118). That is, the network node 10 deems the wireless device to be of the second type.

If the NO path is taken from Block 1104, the network node 10 continues "waiting" for the first subframe, but here it should be understood that significant ongoing processing still occurs while the network node 10 waits. If the NO path is taken from Block 1106, the network node 10 continues waiting for the occurrence of a post-gap subframe in which the wireless device 12 is scheduled for an UL transmission.

The NO path is taken from Block 1108 means that a post-gap subframe for the wireless device 12 occurred and that the wireless device 12 was scheduled to make an UL transmission in that post-gap subframe, but no corresponding transmission was detected by the network node. In this case, the network node 10 determines whether that the wireless device 12 is in good or at least moderate radio conditions (Block 1110). In case the wireless device 12 is in unfavorable radio conditions (NO from Block 1110), the network node 10 continues waiting for the occurrence of a post-gap subframe in which the wireless device 12 is scheduled for an UL transmission. If YES from Block 1110, the network node 10 increases a counter for missed transmissions (Block 1112), and checks whether the counter has reached a defined count or limit threshold (Block 1114).

If so (YES from Block 1114), the network node 10 deems the wireless device 12 to be of the first type, i.e., the network node 10 concludes (Block 1116) that the wireless device 12 does not have the capability, or has only a limited capability, to perform a scheduled UL transmission in the subframe immediately following a measurement gap that was preceded by an UL subframe or by a special subframe. On the other hand, if the counter has not reached its threshold (NO from Block 1114), processing returns to waiting on the next post-gap subframe for the wireless device 12 (Block 1104).

In some sense, the above processing can be understood as inferentially detecting that the wireless device 12 is of the first type. The network node 10 knows that a post-gap subframe has occurred, knows that the wireless device 12 was scheduled to make an UL transmission in the post-gap subframe, and knows that the wireless device 12 enjoys good or at least moderate radio conditions that should not prevent the network 8 from seeing an UL transmission by the wireless device 12. Thus, when the scheduled UL transmission is not detected, the network node 10 can conclude that the wireless device 12 is not capable of performing the transmission—or, at least, the network node 10 can draw that conclusion with a reasonable degree of certainty after observing some number of such failures.

The radio conditions of the wireless device 12 are assessed using reported CQI, for example, or based on Sounding Reference Signals, SRSs, sent by the wireless device 12. Of course, other radio condition estimation techniques may be used—e.g., Block Error Rate, BLER, determinations, etc. The failure counter mechanism seen in Block 1114 provides an efficient mechanism for ensuring that sudden disturbances in the radio conditions do not cause the network node 10 incorrectly conclude that the wireless device is of the first type. As a notable variation or extension of this approach, missed UL transmissions are not counted against the wireless device 12, in cases where the wireless device 12 is not in good or at least moderate radio conditions. The reason being that the wireless device 12 may not be able to receive a signaling grant and hence is not aware of UL allocations in the subframe immediately after the gap.

Information indicating whether any given wireless device 12 is of the first type or of the second type may be stored in a database, either locally in the network node 10, or in some other node in the network, e.g. a core network node, a base station, an Operations Support System, OSS, node, an Operations & Maintenance, O&M, node, a Self-Organizing Network, SON, node, or in some server, cloud, etc. The identification key used in the database may be a device or subscriber identifier, such as an International Mobile Equipment Identifier or IMEI, a Subscriber Identity Module, SIM, an International Mobile Subscriber Identity or IMSI. Additionally, or alternatively, the capability information may be indexed or mapped according to manufacturer identity, device model information, etc. The type capability may further be specified according to the scenario under which it was detected. For instance, the type capability may be distinguished based on whether a given wireless device 12 displayed the behavior during operation in a Carrier Aggregation, CA, mode or during single-carrier operation.

Notably, the capability information stored for any given wireless device 12 may be configured to expire after some time, to allow the information to be refreshed.

As a further embodiment, which may be carried out separate from or in addition to the above-described type determination, the network node 10 may be configured to detect that a given wireless device 12 is performing scheduled UL transmissions in post-gap subframes, but that these transmissions are not consistently successfully received by the network node 10. Based on such observations, the network node 10 in one or more embodiments deduces that the wireless device 12 at best has a limited capability for performing scheduled UL transmissions in post-gap subframes.

FIG. 12 illustrates a contemplated method of scheduling, such as may be implemented by the scheduling circuit 34 of the network node 10 seen in the example of FIG. 9. In particular, the illustrated method 1200 accounts for the first-type/second-type capability of the wireless device 12 at issue in the scheduling.

The method 1200 presumes (Block 1202) that the wireless device 12 has been configured with a measurement gap that is between two UL subframes, or is between an UL subframe and a special subframe (Block 1202). If the wireless device 12 has data to transmit (YES from Block 1204), the network node 10 determines whether the next scheduling opportunity is the first subframe after the measurement gap (Block 1206). If so (YES from Block 1206), the network node 10 determines whether the wireless device 12 is capable of transmitting in post-gap subframes—i.e., in Block 1208, the network node 10 determines whether the wireless device 12 is known to be, or has been determined as being, of the first type or of the second type.

If the network node 10 determines that the wireless device 12 is not capable of performing a scheduled UL transmission in a post-gap subframe (NO from Block 1208), the network node 10 does not schedule the wireless device 12 for the UL transmission (Block 1210). On the other hand, if the wireless device 12 is capable of performing a scheduled UL transmission in a post-gap subframe (YES from Block 1208), the network node 10 may schedule the wireless device 12 for the UL transmission (Block 1212). Similar, when the next scheduling opportunity is not the first subframe after the measurement gap (NO from Block 1206), the network node 10 may schedule the wireless device 12 for the UL transmission (Block 1212). Of course, the scheduling decision may account for a great many other variables and the wireless device 12 may not be scheduled even though it is capable of performing the UL transmission, but the network node 10 performs scheduling operations based on knowing that the wireless device 12 may be scheduled.

FIG. 13 illustrates a method 1300 of a network node 10 configuring the measurement gaps for a wireless device 12, in dependence on whether the wireless device 12 is of the first type or of the second type. The method 1300 begins with the assumption that the wireless device 12 is to be configured with a measurement gap (Block 1302).

The network node 10 checks a database or otherwise carries out other processing, to determine whether the wireless device 12 is capable of transmitting in the first subframe immediate after a measurement gap that is preceded by a special subframe or by an UL subframe (Block 1304). In other words, the network node 10 determines whether the wireless device 12 is of the first type (NO from Block 1306), or is the second type (YES from Block 1306).

If "NO", the network node 10 avoids configuring the wireless device 12 with a measurement gap between two UL subframes or between an UL subframe and a special subframe. If "YES", the network node 10 configures (Block 1310) the wireless device 12 with measurement gap not subject to the offset restrictions applied in Block 1308. Notably, when trying to avoid a measurement gap configuration that is problematic for wireless devices 12 of the first type, the network node 10 may consider the given load conditions—e.g., it makes the avoidance when possible, or when such avoidance fits into the overall other load management and/or scheduling control being performed by the network node 10.

Also of note, the network node 10 may be configured to first check for first-type/second-type capability information in one or more databases. Then, in response to not finding any entry, or any up-to-date entry, for a given wireless device 12, the network node 10 may undertake other actions to determine whether the wireless device 12 is of the first type or of the second type. For example, the network node 10 may carry out the above-described observational operations described above, where it observes the behavior of the wireless device 12 with respect to UL transmissions that are scheduled for the wireless device 12 in one or more post-gap subframes.

In embodiments that use databases, at least one such embodiment uses a centralized database, e.g., in a core network node or in another location that is accessible to multiple nodes that may have need of first-type/second-type information for wireless devices 12. For example, a centralized database may be maintained on a "tracking area" or other service-area coverage basis, such that the first-type/second-type capability determined needs to be made only once for any given wireless device 12 operating within that area. Of course, it is also contemplated that per-node databases are used, such as where each base station maintains a database for the wireless devices 12 that it supports.

Even in such embodiments, these per-node databases may be full or partial copies of a centralized database and/or may be at least partially populated or updated based on retrieving information from a centralized database, and may be shared with one or more neighboring base stations. For example, two eNBs in an LTE network may share type capability information via communications carried over an "X2" interface between the eNBs. Database sharing may be done on a periodic basis, according to some reconciliation or update schedule, and/or may be performed on a triggered basis. In one embodiment, a first base station shares type-capability information with a second base station, for a given wireless device 12, when handing that wireless device 12 over to the second base station.

In further refinements, variations and alternatives, in one or more embodiments herein, a network node 10 uses the type-capability information—i.e., the indication of whether a given wireless device 12 is of the first type or of the second type—for selectively scheduling certain signals. For example, if the network node 10 determines a wireless device 10 has a limited ability to perform UL transmissions in post-gap subframes—e.g., its transmit abilities are degraded or it can perform only a partial transmission—the network node 10 may then schedule that wireless device 12 only for certain types of UL transmissions with respect to post-gap subframes. The certain type of data can be a certain reference signal or data with a certain transport format, or data that is of lower priority, such as best-effort data etc. Examples of such restricted signals include SRS which are transmitted on the last OFDM symbols in an UL subframe—i.e., far from end of gap in time—or data with a robust transport format—such as a very low code rate of 1/3 or lower and/or with lower order-modulation, such as BPSK or QPSK, etc.

As for embodiments in which the network node 10 informs one or more other network nodes regarding the type-capability of given wireless devices 12, it will appreciated that such information informs these other nodes as to whether a particular wireless device 12 is capable of UL transmissions in a post-gap subframe. The network node 10 may further indicate whether it is scheduling or has scheduled the wireless device 12 for an UL transmission in a post-gap subframe. The node receiving that information may use it to adapt its scheduling using one of the above-described embodiments. The advantage is that the receiving node does not need to acquire the UE capability information independently, if that other node begins serving or otherwise supporting the wireless device 12 in question. Information sharing in this manner enables, for example, faster and/or better informed scheduling of the wireless device 12, after a cell change, e.g. a handover, by the device into a service area of the node.

Thus, while it is generally beneficial for a network to include post-gap subframes in its consideration of UL transmission scheduling opportunities, it is recognized herein that doing so degrades mobility performance at wireless devices 12 that have no ability, or only a limited ability, to perform scheduled uplink transmissions in the first subframe immediately following a measurement gap that is positioned between two UL subframes or is positioned between an UL subframe and a special subframe. Thus, the teachings herein propose allowing for such wireless devices 12 to skip UL transmissions in these problematic post-gap subframes, and further to account for such skipping in the overall scheduling processes, so as to avoid wastage of scheduling opportunities and avoid losses in system throughput. For example, as seen in the above teachings, the scheduling process may avoid scheduling UL transmissions for wireless devices 12 of the first type in post-gap subframes, while permitting such scheduling for wireless devices 12 of the second type. As example advantages, by avoiding scheduling a wireless device or UE in subframes it cannot use, the system throughput is preserved. By avoiding configuring the wireless device or UE with particular measurements gap offsets, additionally UE throughput is preserved It should also be noted that the terms "wireless device" and "UE" should be given broad construction. In this disclosure and unless otherwise noted, these terms denote essentially any type of wireless device or apparatus configured for operation in a wireless communication network and/or for communicating with other UEs. Non-limiting examples of UEs include, of course, user equipment configured for operation in 3GPP networks, and more broadly can be essentially any type of radio communication device, including target devices, devices configured for Machine Type Communications or "MTC"—referred to as Machine-to-Machine or M2M devices—devices configured for Device-to-Device, or D2D communications, sensor-equipped devices having wireless communication circuitry, mobile terminals or devices, smartphones, feature phones or other radiotelephone devices, laptop or other computers, PDAs, tablets, USB dongles, various types of Customer Premises Equipment or "CPE", etc.

Further, in the example discussions herein, the terms "radio network node", "network node", and "NW node" are generic and have a broad meaning, unless a specific meaning is noted or apparent from the context. Examples of a network node include, but are not limited to, a base station, radio base station, base transceiver station, base station controller, network controller, eNB, NodeB, relay node, access point, radio access point, Remote Radio Unit, RRU, Remote Radio Head, RRH, etc.

Further, the teachings herein are applicable to single-carrier contexts, as well as to multicarrier or Carrier Aggregation, CA, modes of operation of the involved wireless devices. In CA modes, a wireless device receives and/or transmits data on more than one carrier. The term CA is also referred to as a "multi-carrier system," "multi-cell operation," "multi-carrier operation," "multi-carrier," transmission and/or reception. In CA, the carriers are individually referred to as component carriers or CCs, and one of the CCs is a primary component carrier or PCC, and also may be referred to as the "primary" or "anchor" carrier. The remaining carriers in the aggregation are called secondary component carriers or SCCs. These SCCs also may be referred to as "secondary" or "supplementary" carriers. The serving cell is interchangeably called the primary cell or PCell, or primary serving cell PSC. Similarly, each secondary serving cell is interchangeably referred to as a secondary cell or SCell, or as a secondary serving cell, SSC.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A network node configured for operation in a wireless communication network, said network node comprising:
    a communication interface configured for communicating with at least one of: another network node of a same or different type; and a wireless device operating within the wireless communication network; and
    a processing circuit configured to:
        determine whether the wireless device is of a first type or a second type, where wireless devices of the first type have no ability or a limited ability to transmit in a post-gap subframe, which is any uplink subframe that is the first subframe after a measurement gap that was preceded by an uplink subframe or a special subframe, whereas wireless devices of the second type have the ability, without limitation, to transmit in post-gap subframes; and
        control scheduling of the wireless device with respect to post-gap subframes, in dependence on whether the wireless device was determined to be of the first type or of the second type.

2. The network node of claim 1, wherein the processing circuit is configured to determine whether the wireless device is of the first or the second type, based on obtaining type information from the other network node, or from a database in or accessible to the network node.

3. The network node of claim 1, wherein the processing circuit is configured to determine whether the wireless device is of the first type or the second type based on observing, one or more times, whether the wireless device successfully performs a scheduled uplink transmission in a post-gap subframe, or, despite having acceptable radio conditions, fails to perform the scheduled uplink transmission in the post-gap subframe.

4. The network node of claim 3, wherein, as part of said determining whether the wireless device is of the first type or the second type, the processing circuit is configured to deem the wireless device to be of the first type, responsive to observing a defined number of scheduled uplink transmission failures for the wireless device with respect to scheduled uplink transmissions in corresponding post-gap subframes.

5. The network node of claim 1, wherein the processing circuit is configured to control a measurement gap configuration of the wireless device in dependence on whether the wireless device is determined to be of the first type or the second type.

6. The network node of claim 1, wherein the processing circuit is configured to assign a measurement gap configuration to the wireless device that avoids or reduces the occurrence of post-gap subframes for the wireless device, in response to determining that the wireless device is of the first type.

7. The network node of claim 1, wherein the processing circuit is configured to assign a measurement gap configuration to the wireless device that does not avoid post-gap subframes, in response to determining that the wireless device is of the second type.

8. The network node of claim 1, wherein the processing circuit is configured to control measurement gap configuration assignments for any given plurality of wireless devices, so that, subject to any constraints on the measurement gap configuration assignments, those wireless devices among the given plurality of wireless devices that are determined to be of the first type are assigned measurement gap configurations that avoid or reduce the occurrence of post-gap subframes for those wireless devices that are determined to be of the first type.

9. The network node of claim 1, wherein, responsive to determining that the wireless device is of the first type having a limited ability to transmit in post-gap subframes, the processing circuit is configured to control scheduling of the wireless device by scheduling the wireless device with a signal that is transmitted at the end of the post-gap subframe and/or with a signal associated with a robust transport format.

10. The network node of claim 1, wherein the processing circuit is further configured to transmit capability information for the wireless device to another network node, wherein the capability information indicates whether the wireless device is of the first type or the second type.

11. A method of operation in a network node configured for operation in a wireless communication network that provides communication services to wireless devices, said method comprising:
    determining whether a wireless device is of a first type or a second type, where wireless devices of the first type have no ability or a limited ability to transmit in a post-gap subframe, which is any uplink subframe that is the first subframe after a measurement gap that was preceded by an uplink subframe or a special subframe, whereas wireless devices of the second type have the ability, without limitation, to transmit in post-gap subframes; and controlling scheduling of the wireless device with respect to post-gap subframes in dependence on whether the wireless device was determined to be of the first type or the second type.

12. The method of claim 11, wherein, responsive to determining that the wireless device is of the first type having no ability to transmit in post-gap subframes, controlling scheduling of the wireless device comprises directly or indirectly controlling uplink transmission scheduling of the wireless device, to avoid scheduling an uplink transmission by the wireless device in any post-gap subframe.

13. The method of claim 11, wherein, responsive to determining that the wireless device is of the first type having a limited ability to transmit in post-gap subframes, controlling scheduling of the wireless device comprises directly or indirectly controlling uplink transmission scheduling of the wireless device, to restrict, in accordance with the limited ability of the wireless device to transmit in post-gap subframes, the type of uplink transmission scheduled for the wireless device in any post-gap subframe.

14. The method of claim 11, wherein determining whether the wireless device is of the first or the second type comprises obtaining type information from the other network node, or from a database in or accessible to the network node.

15. The method of claim 11, wherein determining whether the wireless device is of the first or the second type comprises observing, one or more times, whether the wireless device successfully performs a scheduled uplink transmission in a post-gap subframe, or despite the wireless device having acceptable radio conditions, fails to successfully perform the scheduled uplink transmission in the post-gap subframe.

16. The method of claim 15, wherein determining whether the wireless device is of the first type or the second type comprises deeming the wireless device to be of the first type in response to observing a defined number of scheduled uplink transmission failures for the wireless device with respect to scheduled uplink transmissions in corresponding post-gap subframes.

17. The method of claim 11, further comprising controlling a measurement gap configuration of the wireless device, in dependence on whether the wireless device is determined to be of the first type or the second type.

18. The method of claim 11, further comprising assigning a measurement gap configuration to the wireless device that avoids or reduces the occurrence of post-gap subframes for the wireless device, in response to determining that the wireless device is of the first type.

19. The method of claim 11, further comprising assigning a measurement gap configuration to the wireless device that does not avoid post-gap subframes, in response to determining that the wireless device is of the second type.

20. The method of claim 11, further comprising controlling measurement gap configuration assignments for any given plurality of wireless devices, so that, subject to any constraints on the measurement gap configuration assignments, those wireless devices among the given plurality of wireless devices that are determined to be of the first type are assigned measurement gap configurations that avoid or reduce the occurrence of post-gap subframes for those wireless devices that are determined to be of the first type.

21. The method of claim 11, wherein, responsive to determining that the wireless device is of the first type having a limited ability to transmit in post-gap subframes, controlling scheduling of the wireless device comprises scheduling the wireless device with a signal that is transmitted at the end of the post-gap subframe and/or with a signal associated with a robust transport format.

22. The method of claim 11, further comprising transmitting capability information for the wireless device to another network node, wherein the capability information indicates whether the wireless device is of the first type or the second type.

* * * * *